(12) United States Patent
Ikeda et al.

(10) Patent No.: US 7,045,705 B2
(45) Date of Patent: May 16, 2006

(54) CABLE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/935,614

(22) Filed: Sep. 7, 2004

(65) Prior Publication Data

US 2005/0103511 A1 May 19, 2005

(30) Foreign Application Priority Data

Nov. 17, 2003 (JP) ............... 2003-386864

(51) Int. Cl.
*H02G 15/24* (2006.01)
(52) U.S. Cl. ............... 174/21 R; 174/36; 138/120; 58/78.1
(58) Field of Classification Search ............... 174/36, 174/69, 70 R, 71 R, 72 C, 95, 99 R, 21 R, 174/21 JS, 21 JR; 138/110, 120, 155; 59/78.1, 59/900
See application file for complete search history.

(56) References Cited

U.S. PATENT DOCUMENTS

| | | | | |
|---|---|---|---|---|
| 3,053,358 A | * | 9/1962 | Gross | 52/696 |
| 3,157,376 A | * | 11/1964 | Merker et al. | 248/49 |
| 3,590,854 A | * | 7/1971 | Cork | 137/355.16 |
| 4,129,277 A | * | 12/1978 | Tenniswood | 248/51 |
| 4,590,961 A | * | 5/1986 | Schumann | 137/355.16 |
| 4,833,876 A | * | 5/1989 | Kitao et al. | 59/78.1 |
| 5,108,350 A | * | 4/1992 | Szpakowski | 474/207 |
| 6,016,844 A | * | 1/2000 | Takahashi et al. | 138/120 |
| 6,065,278 A | * | 5/2000 | Weber et al. | 59/78.1 |
| 6,067,788 A | * | 5/2000 | Weber | 59/78.1 |
| 6,107,565 A | * | 8/2000 | O'Rourke | 174/21 JS |
| 6,176,072 B1 | * | 1/2001 | Weber | 59/78.1 |
| 6,318,063 B1 | * | 11/2001 | Komiya et al. | 59/78.1 |
| 6,349,534 B1 | * | 2/2002 | Zanolla et al. | 59/78.1 |
| 6,550,232 B1 | * | 4/2003 | Achs et al. | 59/78.1 |

FOREIGN PATENT DOCUMENTS

JP 11-164462 6/1999

* cited by examiner

*Primary Examiner*—William H. Mayo, III
(74) *Attorney, Agent, or Firm*—Woodling, Krost and Rust (57) ABSTRACT

A cable protection and guide device which can protect and guide a cable with a simple connection between the movable end jig and the fixed end jig under various mounting configurations is disclosed. A cable protection and guide device in which when said link frame bodies 10 are left and right reversibly incorporated to each other, and an incorporation error preventing projection 11e, which blocks the connection by interfering with a link plate 11 incorporated in an offset mode, are provided on a surface of at least one of the pair of left and right link plates 11 forming the link frame body 10. Additionally, when the link frame bodies 10 are properly incorporated to each other, a properly connecting region 11f, which avoids interfering with the incorporation error preventing projection 11e, is provided on a surface of a link plate 11 in the link frame body 10.

2 Claims, 4 Drawing Sheets

CABLE PROTECTION AND GUIDE DEVICE

This application claims the priority to Japanese Patent Application 2003-386864, filed Nov. 17, 2003.

TECHNICAL FIELD

The present invention relates to a cable protection and guide device, for securely reliably protecting and guiding a flexible cable or the like, such as an electrical cable, a hydraulic hose, a pneumatic hose, an optical fiber cable or the like, used in industry machines such as a machine tool, an electric device, an industrial robot, a transportation machine or the like, and which electricity feeding, fluid feeding and signaling and the like are performed to the moving machines or movable portions of the machines.

BACKGROUND TECHNOLOGY

Such kinds of cable protection and guide devices includes a number of link frame bodies each comprising a pair of left and right spaced link plates, an inner circumferential side connecting plate bridged over a bending inner circumferential side of this link plate and an outer circumferential connecting plate bridged over a bending outer circumferential side of the link plate. These link frame bodies are articulately connected to each other by connecting pins and connecting pin holes formed in the link plate (see for example Patent Reference 1)

This cable protection and guide device is used when a movable portion and a stationary portion in an industrial machine are connected to each other. And one end of a number of connected link frame bodies is connected to a stationary portion through a fixed end jig and the other end thereof is connected to a movable portion through a movable end jig. An electrical cable, which connects the stationary portion and the movable portion, is inserted into the inner space formed continuously formed link frame bodies. On end of the electrical cable is electrically connected to a driving source such as an electric motor, and the other end thereof is electrically connected to an electricity feeding device.

When in such a cable protection and guide device link frame bodies are left and right reversely incorporated to each other during incorporation, that is when the bending inner circumferential side and the bending outer circumferential side of the link plate are reversely connected to each other, mutual link frame bodies are excessively deformed so that incorporation errors such as connection failure, breakage and the like can be generated. Thus, such an idea that even if mutual link frame bodies are connected in left and right reverse manner a pin and a pin hole are not fitted to each other, is effected by differentiating the diameters of a pin and a pin hole in any one of left and right link plates from the diameters of a pin hole and a pin in the other link plate. Thus incorporation error of connected link frame bodies are avoided.

Patent Reference 1: Specification of Japanese Patent No. 3,157,491 (on page 1, FIG. 1).

SUMMARY OF THE INVENTION

Problems to be Solved by the Invention

However, in such a conventional cable protection and guide device, since the diameters of the pin holes and pins in a pair of left and right link plates are differentiated from each other, an unbalance is generated in the pair of left and right link plates forming a link frame body by wear and the like due to use for a long period of time. As a result there was a problem that not only torsion or the like is generated in the longitudinal direction of cable protection and guide device to remarkably damage endurance, but also the cable can not be stably protected and guided.

Further, as described above, the diameters of the pin holes and pins of a pair of left and right link plates are differentiated from each other. Thus the diameters of the left and right pin holes and pins formed in a movable end jig and a fixed end jig are variously required by setting environment of an industrial machine into which a cable protection and guide device is incorporated, and there were a problems that not only significant limitation is required of a mounting form but also there occurs troublesome production control and parts control.

Accordingly, the object of the present invention are to solve the above-mentioned problems and to provide a cable protection and guide device, which can smoothly reliably protect and guide a cable with a simple connection between the movable end jig and the fixed end jig under various mounting use environment.

Means for Solving the Problems

The invention according to claim 1 attains the above-mentioned problems by a cable protection and guide device in which a plurality of rectangular link frame bodies each comprising a pair of left and right spaced link plates, connecting plates bridged over the bending inner circumferential side and bending outer circumferential side of the pair of link plates respectively are articulately connected to each other by connecting pins and connecting pin holes and a cable is inserted into a cable accommodating space formed of the continuously formed link frame bodies to guide and protect said cable, characterized in that when said link frame bodies are left and right reversely incorporated to each other, an incorporation error preventing projection, which blocks the connection by interfering with a link plate incorporated in an offset mode, is provided on a surface of at least one of the pair of left and right link plates forming said link frame body, and that when said link frame bodies are properly incorporated to each other, a properly connecting region, which avoids interfering with said incorporation error preventing projection, is provided on a surface of a link plate in the link frame body incorporated facing said incorporation error preventing projection.

And the invention according to claim 2 attains the above-mentioned problems by, in addition to the configuration of claim 1, that said incorporation error preventing projection and said properly connecting region are provided on the bending outer circumferential side of said link plate.

Effects of the Invention

Thus, since a cable protection and guide device of the present invention includes the above-described configurations, the following peculiar effects can be obtained.

Namely, according to the cable protection and guide device, which is the invention of claim 1, when said link frame bodies are left and right reversely incorporated to each other, an incorporation error preventing projection, which blocks the connection by interfering with a link plate incorporated in an offset mode, is provided on a surface of at least one of the pair of left and right link plates forming said link frame body, and when said link frame bodies are properly incorporated to each other, a properly connecting region, which avoids interfering with said incorporation error preventing projection, is provided on a surface of a link plate in the link frame body incorporated facing said incorporation error preventing projection. Accordingly, when the link frame body is incorporated in left and right reverse manner, an incorporation error preventing projection abuts on and interferes with a link plate incorporated in an offset mode. Thus, fitting between the connecting pin and the connecting pin hole of link plates to be connected can be perfectly blocked so that an incorporation error can be prevented. And when the link bodies are properly incorporated, a properly connecting region receives the incorporation error preventing projection without any trouble so that reliable fitting between the connecting pin and the connecting pin hole of link plates to be connected is realized and the link plates can be articulately connected to each other.

Further, according to the present invention of claim 1, since in the diameters of a pair of left and right link plates spaced apart from each other, the diameters of the left and right pin holes and pins are formed in the same size unlike a conventional case, unbalance wear, which can be generated in the pair of left and right link plates, torsion in the longitudinal direction of a cable protection and guide device, and the like are significantly suppressed so that a cable can be stably protected and guided even use for a long period of time. Further, even if the diameters of the left and right pin holes and pins formed a movable end jig and a fixed end jig are standardized in a setting environment of an industrial machine into which a cable protection and guide device is incorporated, various mounting forms can be attained and the production control and parts control are also simple.

And according to the cable protection and guide device, which is the invention of claim 2, the incorporation error preventing projection and the properly connecting region are provided on the bending outer circumferential side of said link plate. Thus, in addition to the effects that the invention of claim 1 exerts, when mutual link frame bodies perform bending motion the incorporation error preventing projection can be reliably received in a properly connecting region without trouble in the bending motion and a cable can be smoothly protected and guided. Additionally, a state where the incorporation error preventing projection is reliably received in the properly connecting region can be visually confirmed.

DESCRIPTION OF THE INVENTION

According to the cable protection and guide device of the present invention, when said link frame bodies are left and right reversely incorporated to each other, an incorporation error preventing projection, which blocks the connection by interfering with a link plate incorporated in an offset mode, is provided on a surface of at least one of the pair of left and right link plates forming said link frame body, and when said link frame bodies are properly incorporated to each other, a properly connecting region, which avoids interfering with said incorporation error preventing projection, is provided on a surface of a link plate in the link frame body incorporated facing said incorporation error preventing projection. Accordingly, if a cable protection and guide device is provided with a configuration in which incorporation error between connected link frame bodies can be reliably blocked and a cable can be smoothly, stably protected and guided with a simple connection between the movable end jig and the fixed end jig under various mounting use environment, any embodiment may be used.

For example, if the above-mentioned incorporation error preventing projection and the proper connecting region are provided on a plate surface of at least one of the pair of left and right link plates forming a link frame body, any one of the both plate surfaces and one plate surface may be possible. However, a case where they are provided on only one of the pair of left and right link plates forming a link frame body, a mounting mode is easy to be further visually found.

If a concrete frame structure of a link frame body used in the cable protection and guide device of the present invention is a rectangular frame structure in which a cable is inserted into an accommodating space composed of a number of articulately connected link frame bodies and can be protected and guided, any structure may be used. And even if the pair of left and right link plates spaced away from each other and the connecting plates respectively bridged over the bending inner circumferential side and the bending circumferential side of the link plates are formed integrally or separately, there is no problem.

EXAMPLE

Figure 3:
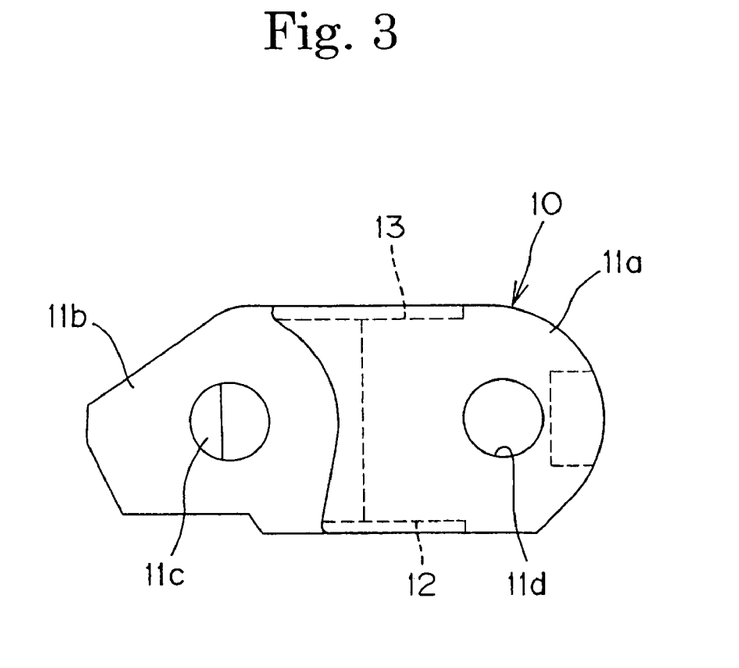
FIG. 3 is a right side view of the link frame bodies shown in FIG. 2.
Figure 4:
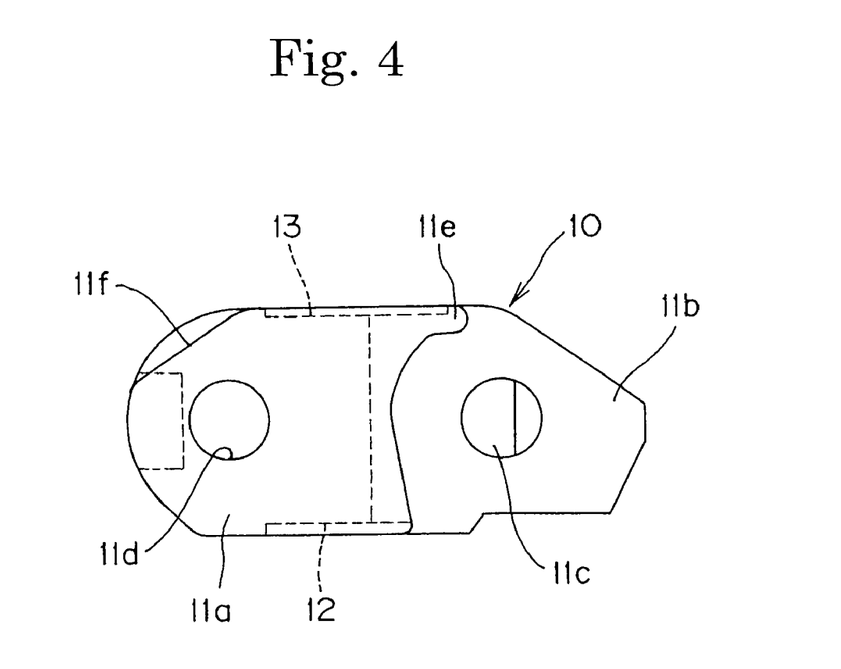
FIG. 4 is a left side view of the link frame bodies shown in FIG. 2.
Figure 5:
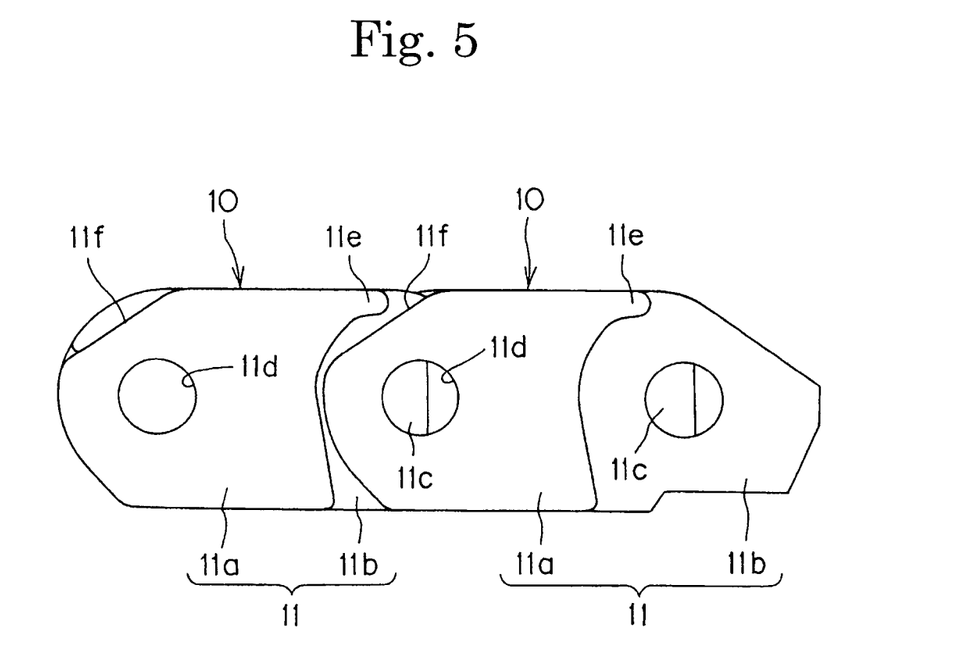
FIG. 5 is an explanatory view in a case where link frame bodies are properly incorporated to each other.
Figure 6:
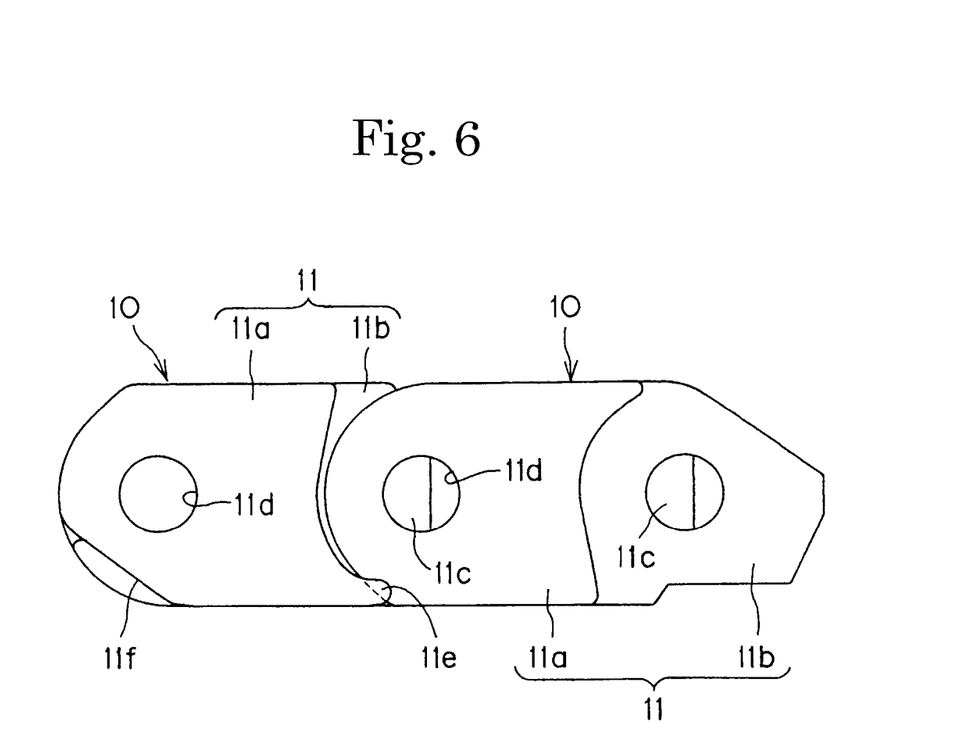
FIG. 6 is an explanatory view in a case where link frame bodies are incorporated to each other with left and side reversed.

An example of a cable protection and guide device of the present invention used as an embodiment will be described with reference to drawings. Here, FIG. 1 a perspective view of a cable protection and guide device, that is one example of the present invention, FIG. 2 is a perspective view when viewed link frame bodies used in the cable protection and guide device of FIG. 1 from the opposite side, FIG. 3 is a right side view of the link frame body shown in FIG. 2, FIG. 4 is a left side view of a link frame body shown in FIG. 2, FIG. 5 is an explanatory view when link frame bodies are properly incorporated to each other and FIG. 6 is an explanatory view when the link frame bodies are left and right reversely incorporated to each other.

Figure 1:
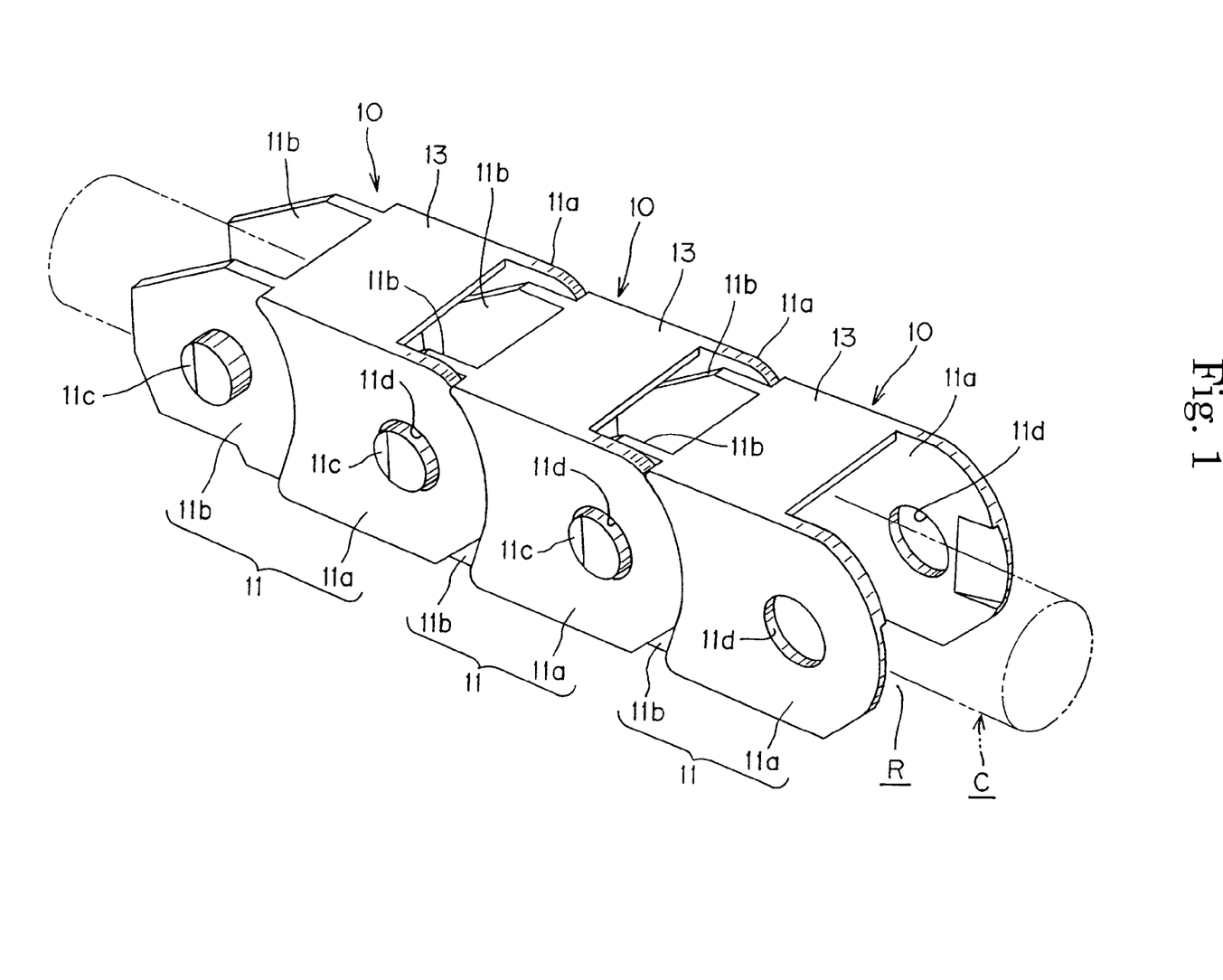
FIG. 1 is a perspective view of a cable protection and guide device, which is one example of the present invention.

First, as shown in FIG. 1, the cable protection and guide device of the present example is used for protecting and guiding a cable or the like C such as an electric cable for transmitting electric signals and supplying electric power to connect between a movable portion and a stationary portion of for example a plasma display, a semiconductor production device, a vehicle and the like or a hose for supplying hydraulic pressure or pneumatic pressure. Rectangular link frame bodies 10 as shown in FIG. 2 are connected in large numbers longitudinally to connect between the movable portion and stationary portion, and can exhibit a linear mode or a bending mode in accordance with the movement conditions between the movable portion and the stationary portion, whereby a cable or the like C is inserted into a cable accommodating space R formed these continuous link frame bodies so as to be protected and guided.

Figure 2:
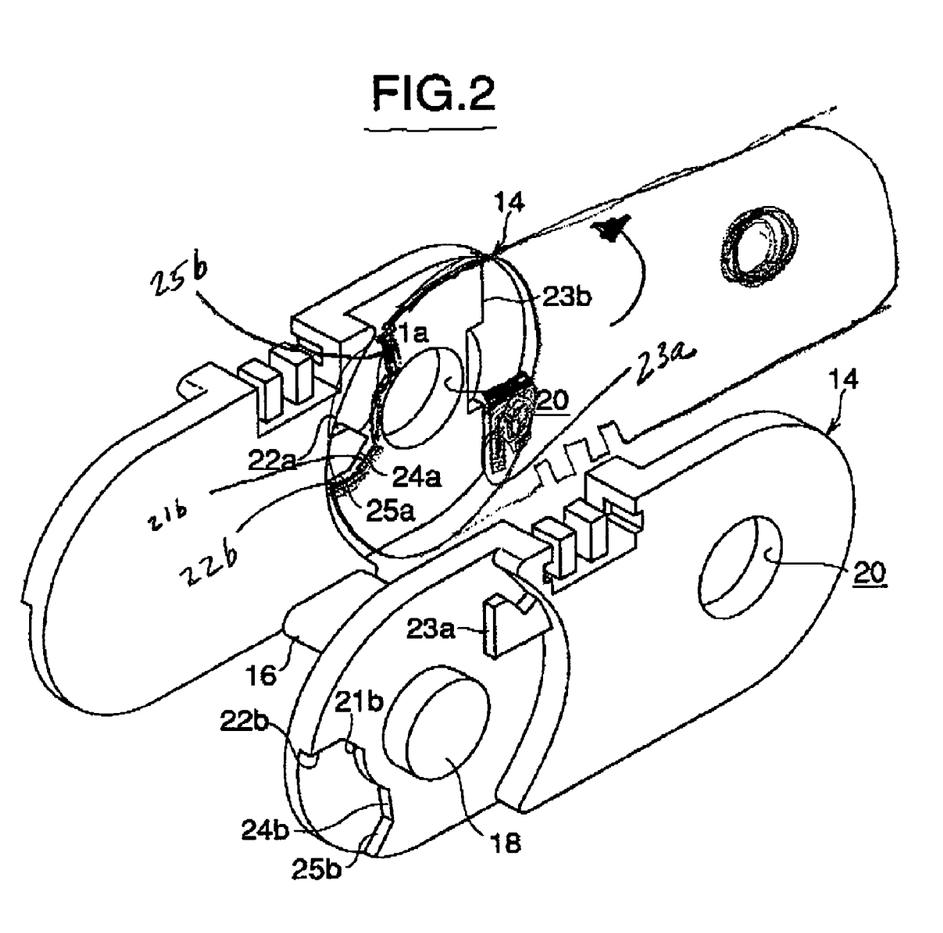
FIG. 2 is a perspective view of link frame bodies used in the cable protection and guide device in FIG. 1 viewed from the opposite side.

The link frame body 10 shown in FIG. 2 uses a glass fiber reinforced polyamide, which can exhibit excellent strength properties, as a material, and a pair of left and right link plates 11, 11 and a bending inner circumferential side connecting plate 12 and a bending outer circumferential side plate 13 respectively bridged over the bending inner circumferential side and the bending outer circumferential side of the link plates 11, 11, are integrally formed in a rectangle shape by injection molding.

The link plate 11 includes a plate surface exhibiting a plate structure with a step formed in a width direction of the plate so called in which the front connecting portion 11a and the rear connecting portion 11b are in offset conditions. The plate thicknesses in these front connecting portion 11a and rear connecting portion 11b are equal to each other, but the link plate 11 produces a mutually deviated step by the thickness of the plate.

Further, in the rear connecting portions 11b, 11b of a pair of left and right link plates 11, 11 are respectively provided connecting pins 11c, 11c of the same diameter, and in the front connecting portions 11a, 11a thereof are respectively provided connecting pin holes 11d, 11d of the same diameter. Further, the connecting pin hole 11d has an inner diameter into which the connecting pin 11c is fitted loosely.

Next concrete forms of the incorporation error preventing projection and the properly connecting region provided in the link frame body 10, which are the most characteristic in the cable protection and guide device of the present example will be described in detail with reference to FIGS. 2 to 6.

First, as shown in FIG. 2, the incorporation error preventing projection 11e and the properly connecting region 11f if are provided on one bending outer circumferential side of a pair of left and right link plates 11, 11 forming the link frame body 10, and this incorporation error preventing projection 11e is reliably received in the properly connecting region 11f in a state without trouble in the bending motion. Further, since the pair of link plates 11, 11 are asymmetrical in the left and right sides, such a receiving state can be easily, visually recognized.

And the incorporation error preventing projection 11e is formed in such a projection form that a part of the link plate 11 is projected from a rear end of the connecting portion 11a arranged on a front side of the link plate 11. On the other hand, the properly connecting region 11f is formed in such a recess form that a part of a front end of the front connecting portion 11a disposed on the front side of the link plate 11 is cut off slantly and is adapted to be incorporated facing the incorporation preventing projection.

Therefore, in incorporating production of the cable protection and guide device, when link frame bodies 10, 10 are incorporated to each other in a left and right reversed manner as shown in FIG. 6, the incorporation preventing projection 11e interfere with a front end of a front connecting portion 11a of the subsequent link plate 11 to block the connection therebetween. Alternatively, as shown in FIG. 5 the link frame bodies 10, 10 are properly incorporated to each other, the incorporation preventing projection 11e is received in the properly connecting region 11f of the subsequent link plate 11 (shown in hypothetical lines in FIG. 2) so that articulable connection between the link frame bodies 10, 10 are allowed.

Further, although not shown when the last link frame body 10 and the front link frame body connected from this last link frame body 10 to the length required for a movement stroke are respectively connected to a fixed end jig and a movable end jig respectively attached to a stationary portion and a movable portion of an industrial machine, connecting pins 11c, 11c and connecting pin holes 11d, 11d of the same diameter are respectively provided in a pair of left and right link plates 11, 11. Thus, even if the movable end jig and the fixed end jig are reversely incorporated the their connection can be performed so that the cable protection and guide device can be attached in accordance with a mounting environment between a stationary portion and a movable portion of an industrial machine without the variety of connection forms between the movable end jig and the fixed end jig.

When the thus obtained cable protection and guide device of the present invention is incorporated into a plasma display or a semiconductor production device and the movable portion of the cable protection and guide device is moved, a link frame body 10 reaches a linear state and a bending state in accordance with the movement stroke and a cable C can be guided while being protected.

Further, in the incorporating production, when the link frame bodies 10 are properly incorporated to each other, the properly connecting region 11f receives the incorporation error preventing projection 11e without trouble and the connecting pins 11c, 11c and the connecting pin holes 11d, 11d are reliably fitted to each other so that the link frame bodies can be articulately connected to each other. However, when the link frame bodies 10 are incorporated to each other with left and right reversed, the incorporation error preventing projection 11e perfectly blocks the fitting of the connecting pins 11c, 11c to the connecting pin holes 11d, 11d of link plates 11, 11 to be connected to each other so that an incorporation error can be prevented, and a cable can be smoothly, stably protected and guided in a simple connection between the movable end jig and the fixed end jig under various mounting use environment.

Further, since the incorporation error preventing projection 11e and the properly connecting region 11f are provided on the bending outer circumferential side of the link plate 11, the incorporation error preventing projection 11e is bent without trouble in the bending motion of the link frame body 10 so that the cable can be smoothly protected and guided. Further, the incorporation error preventing projection 11e permits a proper mounting state to be visually recognized.

DESCRIPTION OF REFERENCE NUMERALS

10 . . . Link frame body
11 . . . Link plate
11a . . . Front connecting portion
11b . . . Rear connecting portion
11c . . . Connecting pin
11d . . . Connecting pin hole
11e . . . Incorporation error preventing projection
11f . . . Properly connecting region
12 . . . Bending inner circumferential side connecting plate
13 . . . Bending outer circumferential side connecting plate
C . . . Cable or the like
R . . . Cable accommodating space

We claim:

1. A cable protection and guide device in which a plurality of respectively adjacent rectangular link frame bodies each comprises a pair of left and right spaced link plates, each of said left and right spaced link plates includes a bending inner circumferential side, bending outer circumferential side, connecting pins and connecting pin holes, connecting plates are bridged over said bending inner circumferential side and said bending outer circumferential side of each pair of said link plates respectively, each of said rectangular link bodies are articulately connected to each other by said connecting pins and connecting pin holes and, a cable is inserted into a cable accommodating space formed by said link frame bodies to guide and protect said cable, characterized in that:

one of each of said left and riaht spaced link plates include a first surface, an orientation protecting projection is provided on said first surface of said one of each pair of left and right link plates, said orientation protecting projection prohibits incorrect connection of said rectangular link frame bodies, said one of each of said left and right link frame plates includes a tapered surface, said tapered surface facing a corresponding said orientation protecting projection on a first surface of an adjacent link plate of an adjacent frame body, and, said connecting pins and connecting pin holes are the same diameter and are the same diameter on both said right and left link plates which in combination with said orientation protecting projection prevents incorrect assembly of adjacent link bodies together.

2. The cable protection and guide device according to claim 1, characterized in that said orientation protecting projection and said tapered surface are provided on said bending outer circumferential sides of said link plates of said frame bodies.

* * * * *

UNITED STATES PATENT AND TRADEMARK OFFICE
CERTIFICATE OF CORRECTION

PATENT NO. : 7,045,705 B2 Page 1 of 1
APPLICATION NO. : 10/935614
DATED : May 16, 2006
INVENTOR(S) : Ikeda et al.

It is certified that error appears in the above-identified patent and that said Letters Patent is hereby corrected as shown below:

Column 2, line 5, after "of" insert --a--.

Column 3, line 44, after "confirmed." delete -BREIF - and insert -- BRIEF --.

Column 5, line 23, after "Next" insert --, --.

Column 5, line 29, after "11f" delete "if".

Column 7, line 4, after "and" delete - riaht - and insert -- right --.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,045,705 B2
APPLICATION NO. : 10/935614
DATED : May 16, 2006
INVENTOR(S) : Ikeda et al.

It is certified that error appears in the above-identified patent and that said Letters Patent is hereby corrected as shown below:

Column 2, line 5, after "of" insert --a--.

Column 3, line 44, after "confirmed." delete -BREIF - and insert -- BRIEF --.

Column 5, line 23, after "Next" insert --, --.

Column 5, line 29, after "11f" delete "if".

Column 7, line 4, after "and" delete - riaht - and insert -- right --.

Delete Drawing Sheet 2 of 4 and substitute therefor the attached Drawing Sheet 2 of 4.

This certificate supersedes Certificate of Correction issued August 22, 2006.

Signed and Sealed this

Thirtieth Day of October, 2007

JON W. DUDAS
*Director of the United States Patent and Trademark Office*

FIG.2